US005809440A

United States Patent [19]
Beck et al.

[11] Patent Number: 5,809,440
[45] Date of Patent: Sep. 15, 1998

[54] AGRICULTURAL IMPLEMENT HAVING MULTIPLE AGENTS FOR MAPPING FIELDS

[75] Inventors: James L. Beck, Los Gatos; Malcolm L. Kinter, Sunnyvale, both of Calif.

[73] Assignee: Patchen, Inc., Los Gatos, Calif.

[21] Appl. No.: 808,497

[22] Filed: Feb. 27, 1997

[51] Int. Cl.[6] .............................. B05B 9/06; G06F 13/00
[52] U.S. Cl. .................. 701/50; 701/213; 47/1.7
[58] Field of Search ............................ 701/50, 207, 208, 701/205, 213, 300; 342/457, 357; 340/825.07, 825.08; 47/1.7

[56] References Cited

U.S. PATENT DOCUMENTS

| | | | |
|---|---|---|---|
| 2,514,405 | 7/1950 | Marihart | 250/239 |
| 2,682,132 | 6/1954 | Marihart | 47/1 |
| 2,894,178 | 7/1959 | Chesebrough et al. | 317/130 |
| 3,373,870 | 3/1968 | Black et al. | 209/111.6 |
| 3,488,511 | 1/1970 | Mori et al. | 250/226 |
| 3,512,587 | 5/1970 | Shader | 172/57 |
| 3,590,925 | 7/1971 | Troutner | 176/6 |
| 3,609,913 | 10/1971 | Rose | 47/1.43 |
| 3,652,844 | 3/1972 | Scott, Jr. | 240/1 |
| 3,701,218 | 10/1972 | Priest | 47/1.43 |
| 3,821,550 | 6/1974 | Priest | 250/226 |
| 3,910,701 | 10/1975 | Henderson et al. | 356/39 |
| 4,013,875 | 3/1977 | McGlynn | 235/150.2 |
| 4,015,366 | 4/1977 | Hall, III | 47/1 |
| 4,029,391 | 6/1977 | French | 350/96 |
| 4,092,800 | 6/1978 | Wayland, Jr. et al. | 47/1.3 |
| 4,179,216 | 12/1979 | Theurer et al. | 356/4 |

(List continued on next page.)

FOREIGN PATENT DOCUMENTS

| | | |
|---|---|---|
| 231270 | 11/1984 | Germany . |
| 229625 | 6/1989 | New Zealand . |
| 203340 | 12/1967 | Russian Federation . |
| 471074 | 6/1973 | U.S.S.R. . |
| 382367 | 8/1973 | U.S.S.R. . |
| 547183 | 4/1977 | U.S.S.R. . |
| 590 598 | 7/1947 | United Kingdom . |
| 2 200 446 | 8/1988 | United Kingdom . |

OTHER PUBLICATIONS

Proceedings of the 1991 Symposium, American Society of Agricultural Engineers, W. L. ZFelton et al., "A Microprocessor Controlled Technology To Selectively Spot Spray Weeds", 8 pages (Dec. 16–17 1991).

B. B. Nitsch et al., "Visible And Near Infrared Plant, Soil And Crop Residue Refelctivity For Weed Sensor Design", American Society of Agricultural Engineers, Jun. 23–26, 1991).

Geoffrey J. Shropshire et al., "Fourier and Hadamard Transforms For Detecting Weeds in Video Images", pp. 1–18, American Society of Agricultural Engineers, (Dec. 12–15, 1989).

Geoffrey J. Shropshire et al., "Optical Reflectance Sensor for Detecting Plants", SPIE vol. 1379, pp. 222–235, (1990).

"Selective Sprayer", Cotton Farming, 1 page. Date Unknown.

(List continued on next page.)

*Primary Examiner*—Michael Zanelli
*Attorney, Agent, or Firm*—Skjerven, Morrill, MacPherson Franklin and Friel; Arthur J. Behiel

[57] ABSTRACT

An agricultural implement in accordance with the present invention includes a supporting member affixed to a farm vehicle, such as a tractor. The supporting member supports a plurality of sensors that each has a unique physical location along the supporting member such that the sensors traverse parallel paths as the vehicle moves across a field. Information gathered by the sensors can be combined with information as to the vehicle's position to create a map of the field. For example, information indicative of the presence or absence of weeds at specific locations in a field can be used to create a weed-map. To ensure that such maps accurately depict a field, the agricultural implement includes a control unit configured to automatically assign each sensor unit a unique address based upon the physical location of each sensor.

14 Claims, 4 Drawing Sheets

U.S. PATENT DOCUMENTS

| | | | |
|---|---|---|---|
| 4,206,569 | 6/1980 | Randolph | 47/1.7 |
| 4,354,339 | 10/1982 | Nokes | 56/10.2 |
| 4,369,886 | 1/1983 | Lane et al. | 209/564 |
| 4,443,866 | 4/1984 | Burgiss, Sr. | 364/900 |
| 4,482,960 | 11/1984 | Pryor | 364/424 |
| 4,527,897 | 7/1985 | Okabe | 356/407 |
| 4,550,526 | 11/1985 | Smucker | 47/1.5 |
| 4,558,786 | 12/1985 | Lane | 209/558 |
| 4,618,257 | 10/1986 | Bayne et al. | 356/71 |
| 4,626,993 | 12/1986 | Okuyama et al. | 364/424 |
| 4,628,454 | 12/1986 | Ito | 364/424 |
| 4,630,773 | 12/1986 | Ortlip | 239/1 |
| 4,674,048 | 6/1987 | Okumura | 364/424 |
| 4,699,273 | 10/1987 | Suggi-Liverani et al. | 209/580 |
| 4,709,265 | 11/1987 | Silverman et al. | 358/109 |
| 4,709,505 | 12/1987 | Lempa, Jr. | 47/1.7 |
| 4,727,475 | 2/1988 | Kiremidjian | 364/200 |
| 4,744,207 | 5/1988 | Hanley et al. | 56/16.6 |
| 4,768,713 | 9/1988 | Roper | 239/77 |
| 4,768,715 | 9/1988 | Sali et al. | 239/166 |
| 4,878,598 | 11/1989 | Ruschhaupt, Jr. | 222/1 |
| 4,991,341 | 2/1991 | Douglas | 47/1.7 |
| 5,015,868 | 5/1991 | Park | 250/561 |
| 5,021,645 | 6/1991 | Satula et al. | 250/223 |
| 5,050,771 | 9/1991 | Hanson et al. | 222/1 |
| 5,068,540 | 11/1991 | Tsuji | 250/561 |
| 5,072,128 | 12/1991 | Hayano et al. | 250/572 |
| 5,109,161 | 4/1992 | Horiuchi et al. | 250/561 |
| 5,144,767 | 9/1992 | McCloy et al. | 47/1.7 |
| 5,204,669 | 4/1993 | Dorfe et al. | 340/825.52 |
| 5,222,324 | 6/1993 | O'Neall et al. | 47/1.7 |
| 5,237,386 | 8/1993 | Harley | 356/338 |
| 5,278,423 | 1/1994 | Wangler et al. | 250/561 |
| 5,319,196 | 6/1994 | Cleven | 250/231.13 |
| 5,386,285 | 1/1995 | Asayama | 356/356 |
| 5,389,781 | 2/1995 | Beck et al. | 250/226 |
| 5,438,817 | 8/1995 | Nakamura | 56/10.2 A |
| 5,507,115 | 4/1996 | Nelson | 47/1.7 |
| 5,520,333 | 5/1996 | Tofte | 239/10 |
| 5,585,626 | 12/1996 | Beck et al. | 250/222.1 |
| 5,636,342 | 6/1997 | Jeffries | 395/185.01 |
| 5,704,546 | 1/1998 | Henderson et al. | 239/1 |

OTHER PUBLICATIONS

"*Sucker Punch*", California Farmer, p. 18 (Feb. 1995).

"*A New Age of Weed Control*", Kelly Baron, The Grower, pp. 20–24 (Feb. 1993).

Patchen On Target, 4 pages (Fall 1994).

"*The Newest Weedseeker is a Hit*", Patchen On Target, 4 pages, (Spring 1995).

"*Waging War on Weeds*", Grape Grower, Marni Katz, vol. 27, No. 9, 4 pages (Sep. 1995).

Patchen On Target, 4 pages, (Winter 1993).

Patchen On Target, 4 pages (Spring 1994).

Patchen Selective Spray Systems, "*Reduced Herbicide Usage is Perennial Crops, Row Crops, Fallow Land and Non–Agricultural Applications Using Optoelectronic Detection*", 10 pages, (1994).

AGRICULTURAL IMPLEMENT HAVING MULTIPLE AGENTS FOR MAPPING FIELDS

BACKGROUND

1. Field of the Invention

The present invention relates to the creation and use of maps of agricultural fields. More particularly, the present invention relates to agricultural implements for creating such field maps and for performing operations, such as selective application of herbicide, based on field maps.

2. Related Art

U.S. Pat. No. 5,050,771 (the '771 patent) discloses a microprocessor-based control unit that controls the application of specified materials (e.g., herbicide) onto a field. Areas of interest, such as areas including patches of weeds, are manually programmed into the control unit as they are observed during a first pass across the field. The control unit stores the program as a field map that is later used to automatically control the application of some material to the areas of interest.

The advantage of mapping a field, as opposed to simply sensing the presence of weeds for example, is that spots can be treated separately from the main portions of the field even when the condition to be controlled (e.g., weed growth) is not visible. This is of particular interest in small grain farming or sugar beet farming where weed patches can be seen at some times of a growing cycle but are obscured by a crop at other times.

Manually entering data for field mapping is labor intensive, especially where high-resolution of field features is desired. This problem is addressed in U.S. patent application Ser. No. 08/276,002, entitled "Apparatus And Method For Determining A Distance To An Object In A Field For The Controlled Release of Chemicals On Plants, Weeds, Trees Or Soil And/Or Guidance Of Farm Vehicles," filed Jul. 15, 1994, by James L. Beck and Malcolm L. Kinter and issued as U.S. Pat. No. 5,585,626 on Dec. 17, 1996 (the subject matter of which is incorporated herein by reference). That application teaches the use of an array of sensors to automatically gather information bearing on different environmental factors to determine how and when to till, fertilize, and harvest. In one embodiment of that invention, information with which to make a map of a field is gathered automatically when the field is traversed for another purpose, such as cultivating.

FIG. 1 (Prior Art) shows a vehicle 10, in this case a tractor, traversing a field along an axis of travel AT. A plurality of sensors 12 and spray nozzles (not shown) are mounted adjacent one another on vehicle 10 via a supporting member 14. Each sensor is physically located a specified distance from the axis of travel such that sensors 12 traverse parallel paths as vehicle 10 moves across the field along the axis of travel AT.

In one embodiment, sensors 12 illuminate the field with modulated light and measure the spectral reflectance characteristics of light scattered off of the field. These characteristics are used to identify weeds. As a result, only the weeds 16 are sprayed; the row crops 18 are not sprayed and herbicide is not wasted on bare soil.

As vehicle 10 moves a given one of sensors 12 and a corresponding sensor control unit (not shown) across a field, the control unit records the soil/plant information and position information in a storage device (e.g., a hard-disk drive) as a map of the detected characteristics of the field. In some embodiments, the data storage device also receives position information from a global positioning system (GPS) device. The map can later be downloaded from the data storage device for analysis. The map may also be used to tailor subsequent operations, such as planting, based on the mapped field characteristics. Further, multiple field maps gathered during multiple growing seasons and for different types of crops can be compared and analyzed. Field characteristics can also be analyzed in real time to allow, for example, herbicide application rates to be adjusted as vehicle 10 traverses the field.

Field mapping requires a consistent correspondence between the physical location of a given sensor on the supporting member and its address. Information gathered by that sensor can then be appropriately located on the map. Unfortunately, this correspondence can be difficult to maintain. For example, extreme operating conditions can disable sensor units 12, necessitating their removal and replacement. Sensors 12 typically encounter mechanical stresses, dust, mud, and agricultural chemicals. Moreover, the number and placement of sensors 12 can change for different applications.

The requirement of a correspondence between the physical location and address of each sensor 12 complicates the process of replacing sensors because care must be taken to ensure that the correspondence is maintained. For example, if an operator (e.g., a farmer) were to remove the outermost two sensors for cleaning and then transpose their physical locations during installation, the control unit would generate a map having the data from the outermost two sensors transposed. Thus, operators must be vigilant in their efforts to correctly install sensors 12.

Other embodiments of FIG. 1 use other types of agents in place of sensors 12 and the herbicide sprayers. For example, row crops 18 may be sprayed with nutrients, pesticide, or water. In other applications no type of spray is used; rather, the amount of seed applied to an area of the field is controlled based on the properties of the field in that area. Thus, the foregoing problem is not limited to the transposition or replacement of sensors, but also occurs for other types of agents. There is therefore a need for an agricultural implement that maintains a correspondence between the physical locations of agents and their addresses without requiring any operator intervention.

SUMMARY

The present invention facilitates field mapping by addressing the need for an agricultural implement that maintains a correspondence between the physical locations of agents and their addresses without requiring any operator intervention.

An agricultural implement in accordance with the present invention includes a supporting member affixed to a farm vehicle, such as a tractor. The supporting member supports a plurality of sensor units that each has a unique physical location along the supporting member such that the sensor units traverse parallel paths as the vehicle moves across a field. The unique physical locations of the sensor units are defined relative to a reference position indicated by a conventional global positioning system (GPS).

The agricultural implement combines information gathered by the sensor units with the physical locations of the sensors units to create a map of the field. For example, information indicative of the presence or absence of weeds can be used to create a weed-map of the field.

To ensure that maps accurately depict a field, the agricultural implement includes a control unit configured to automatically assign each sensor unit a unique address based upon the physical location of that sensor relative to the reference position indicated by the GPS. This correspondence between the physical location and address of each sensor unit allows a mapping unit to precisely map information gathered by the sensor units.

BRIEF DESCRIPTION OF THE FIGURES

FIG. 1 shows a vehicle 10 traversing a field along an axis of travel AT.

DETAILED DESCRIPTION

Figure 2:
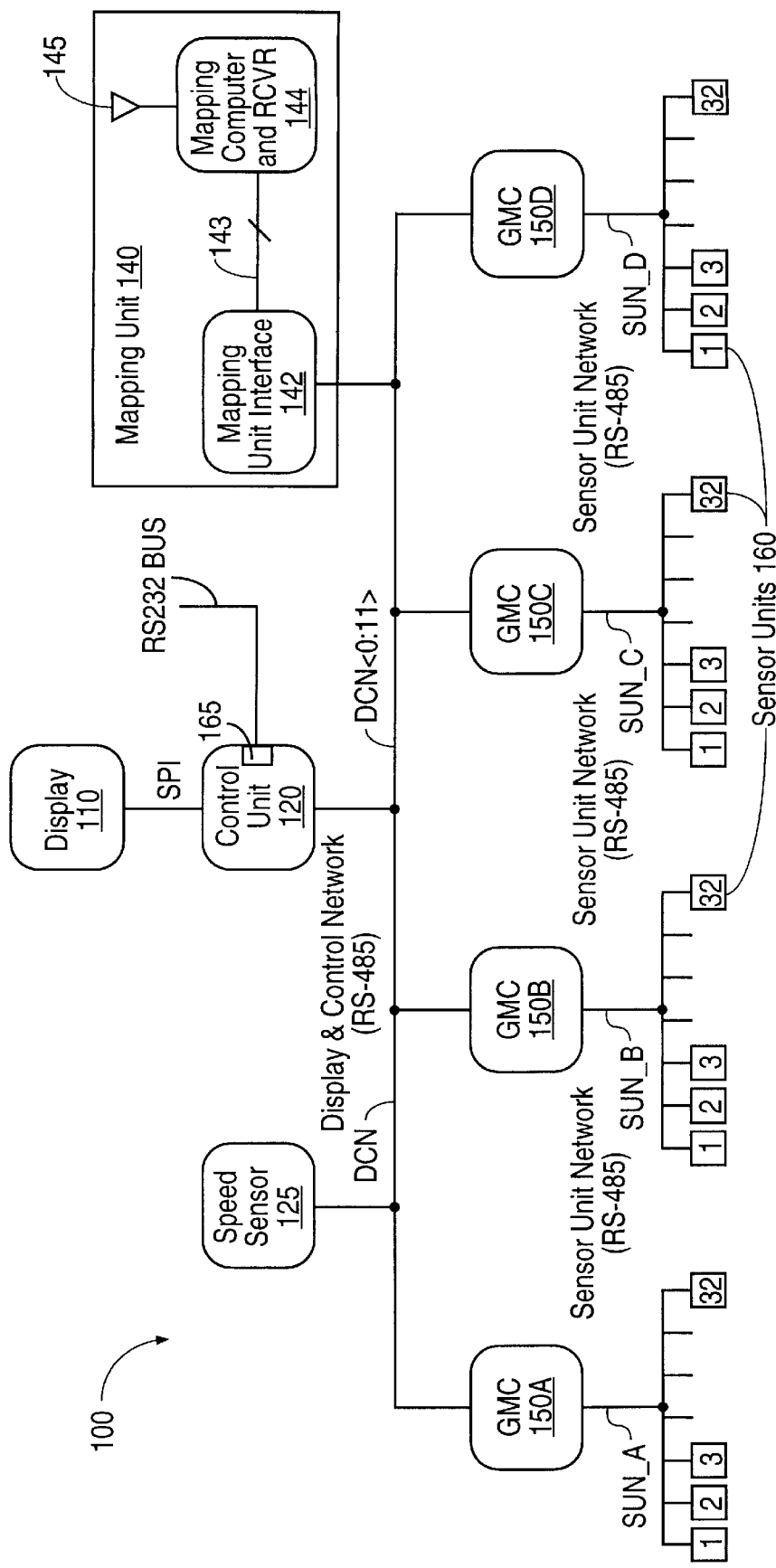
FIG. 2 is a block diagram of a weed spraying system 100 in accordance with the present invention.

FIG. 2 is a block diagram of a weed spraying system 100 in accordance with the present invention. System 100 includes a display 110 connected to a control unit 120. Control unit 120 is connected to a speed sensor 125, a mapping unit 140, and group master controllers (GMCs) 150A–D via a 12-line display-and-control network DCN. Each of GMCs 150A–D is connected to up to 32 sensor units 160 via respective sensor unit networks SUN_A–D. In one embodiment, networks DCN and SUN comprise Electronics Industry Association (EIA) standard RS-485 buses.

Figure 1:
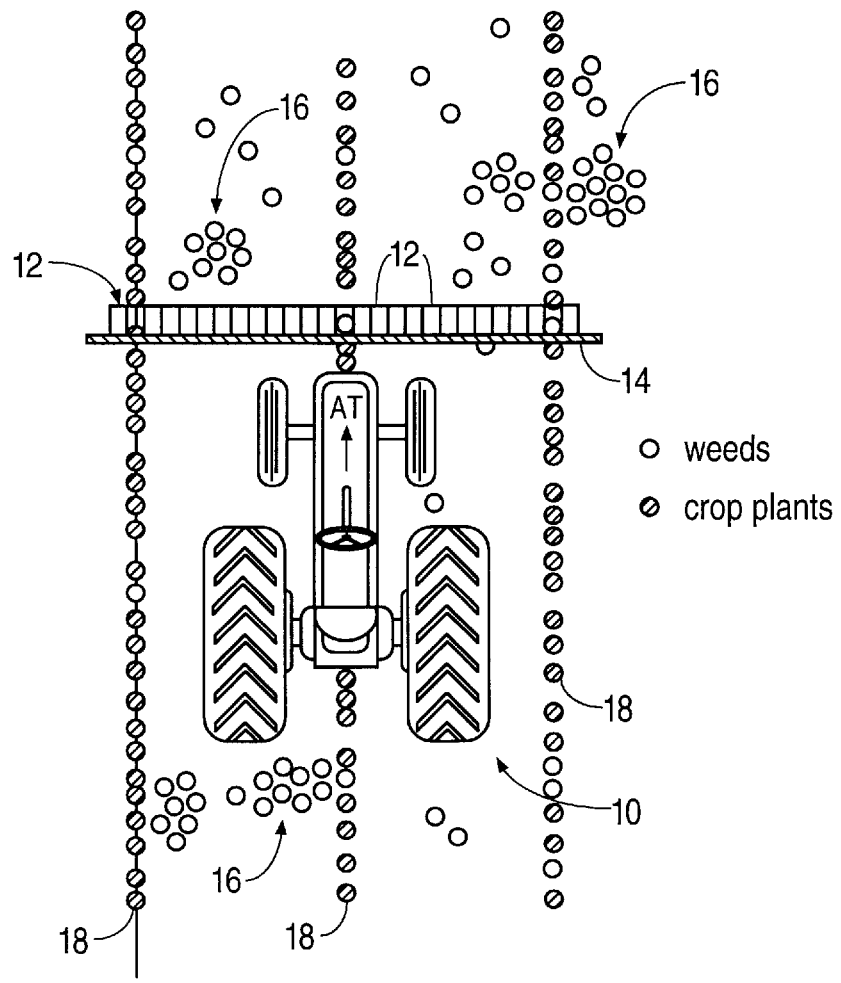

Sensor units 160 include optical sensors and spray nozzles. To prevent the spray from interfering with the optical sensors, the spray nozzles are offset from the optical sensors so that the weeds are not sprayed when they are detected but rather are sprayed at a later time when the spray nozzles pass over a detected weed, as explained in U.S. patent application Ser. No. 07/920,942 (now U.S. Pat. No. 5,296,702). Speed sensor 125, a conventional speed sensor, provides speed information to sensor units 160 that allows sensor units 160 to properly time the release of herbicide. In other embodiments, more than one speed sensor unit may be employed to more precisely determine the speeds of the individual sensor units 160. For example, a pair of speed sensors can be located at the extreme ends of a supporting member similar to supporting member 14 of FIG. 1. This is desirable where, for example, vehicle 10 sprays herbicide while turning, which causes the inside sensor unit 160 to travel at a slower pace relative to the field than does the outside sensor unit 160. Such speed sensors may be adapted to connect to one or more of sensor unit networks SUN_A–D.

Mapping unit 140 includes a mapping-unit interface 142 connected via a bus 143 to a mapping computer and receiver unit 144. In one embodiment, bus 143 complies with the well-known Controller Area Network (CAN) serial communications protocol. The CAN protocol is commonly used in applications such as automotive electronics. Mapping unit 140 uses data obtained from sensor units 160 and positional information received via a GPS antenna 145 to create a map of a given field. In one embodiment, mapping computer and receiver unit 140 is a portion of a precision-farming system available from Deere & Company of Moline, Ill., as the GreenStar™ system.

Control unit 120 serves as the operator interface for system 100. Accordingly, control unit 120 includes a number of user controls (not shown). These controls may include knobs and switches mounted directly to control unit 120 or a graphical user interface running on a PC connected to a conventional RS-232 PC interface port 165 of control unit 120. The PC interface, when in use, disables other user controls and allows all system functions to be accessed via port 165.

Control unit 120 receives information from individual sensor units 160 via GMCs 150A–D. Control unit 120 translates this information into displayable form by correlating information gathered by each one of sensor units 160 with the corresponding physical location of one of sensor units 160. For example, when a selected one of sensor units 160 detects the presence of a weed, an LED corresponding to that unit illuminates, giving the operator a visual indication of the functioning sensor unit. Control unit 160 also receives self-test results from each of sensor units 160 and displays those results.

For a detailed discussion of sensor units that may be used in conjunction with the present invention, see the copending, commonly owned U.S. patent application Ser. No. 08/740, 592, filed Oct. 31, 1996, entitled "DETECTING PLANTS IN A FIELD BY DETECTING A CHANGE IN SLOPE IN A REFLECTANCE CHARACTERISTIC," by Malcolm L. Kinter and James L. Beck, and commonly owned U.S. patent application Ser. No. 08/664,600, filed Jun. 17, 1996, entitled "HIGH SPEED SOLENOID VALVE CARTRIDGE FOR SPRAYING AN AGRICULTURAL LIQUID IN A FIELD," by Malcolm L. Kinter. Those applications are incorporated herein by reference.

Because of the importance of correctly locating weeds, control unit 120 is configured to automatically correlate, for each of sensor units 160, a unique device address and with the physical location of the sensor unit relative to a reference position indicated by a conventional global positioning system (GPS). Each of sensor units 160 is positioned a unique distance from the axis of travel AT of the vehicle upon which the sensor is mounted (e.g., vehicle 10 of FIG. 1). The unique addresses are then conveyed along with data from sensor units 160 to mapping unit 140 so that mapping unit 140 can generate a map of one or more field characteristics. For example, mapping unit 140 can generate and store a field map indicating the locations of weeds. This aspect of the invention is discussed in detail below in connection with FIGS. 3 and 4.

On power-up, control unit 120 detects devices on display-and-control network DCN, including sensor units 160 by way of GMCs 150A–D. Also on power-up, control unit 120 installs those devices that are not correctly addressed for their current physical location. This installation procedure is repeated each time power is applied to system 100 to ensure that:

1. the expected number of devices is detected;

2. each device has a unique address assignment; and 3. the unique address assignment for each sensor unit correctly corresponds with the physical location of that sensor unit.

Control unit 120 thus detects and installs any devices (e.g., GMC 150A and/or one or more of sensor units 160) replaced or added in the field.

Field installation or replacement of one or more of GMCs 150A–D or sensor units 160 is complicated by the requirement that the position (i.e., physical location) of each of sensor units 160 be associated with a corresponding address. This is because mapping unit 140, to map a field, must know the physical location of each of sensor units 160 to determine which location on a field corresponds to a particular signal. For example, if the left-most one of sensor units 160 detects a weed and the right-most sensor does not, a map generated by mapping unit 140 must reflect the correct location of the weed. Thus, if the left-most and right-most sensors were swapped (e.g., for cleaning or maintenance), then control unit 120 must account for the change in locations. Control unit 120 therefore reestablishes the appropriate correspondence between the addresses of sensor units 160 and their respective physical locations without requiring operator intervention.

All of the devices on the DCN and SUN_A–D networks are synchronized by control unit 120. Synchronization prevents interference between physically adjacent ones of sensor units 160 and simplifies the communications protocol requirements on both the DCN and SUN network segments. This simple protocol requirement permits the implementation of GMCs 150A–D and sensor units 160 using relatively inexpensive, low-speed microcontrollers. Synchronization is additionally advantageous because it 1. simplifies some of the most complicated aspects of implementing the communications protocol (e.g., collision detection and avoidance, retries, addressing);

2. guarantees determinism in end-to-end message delivery; and 3. allows for more complete utilization of the available network bandwidth.

Figure 3:
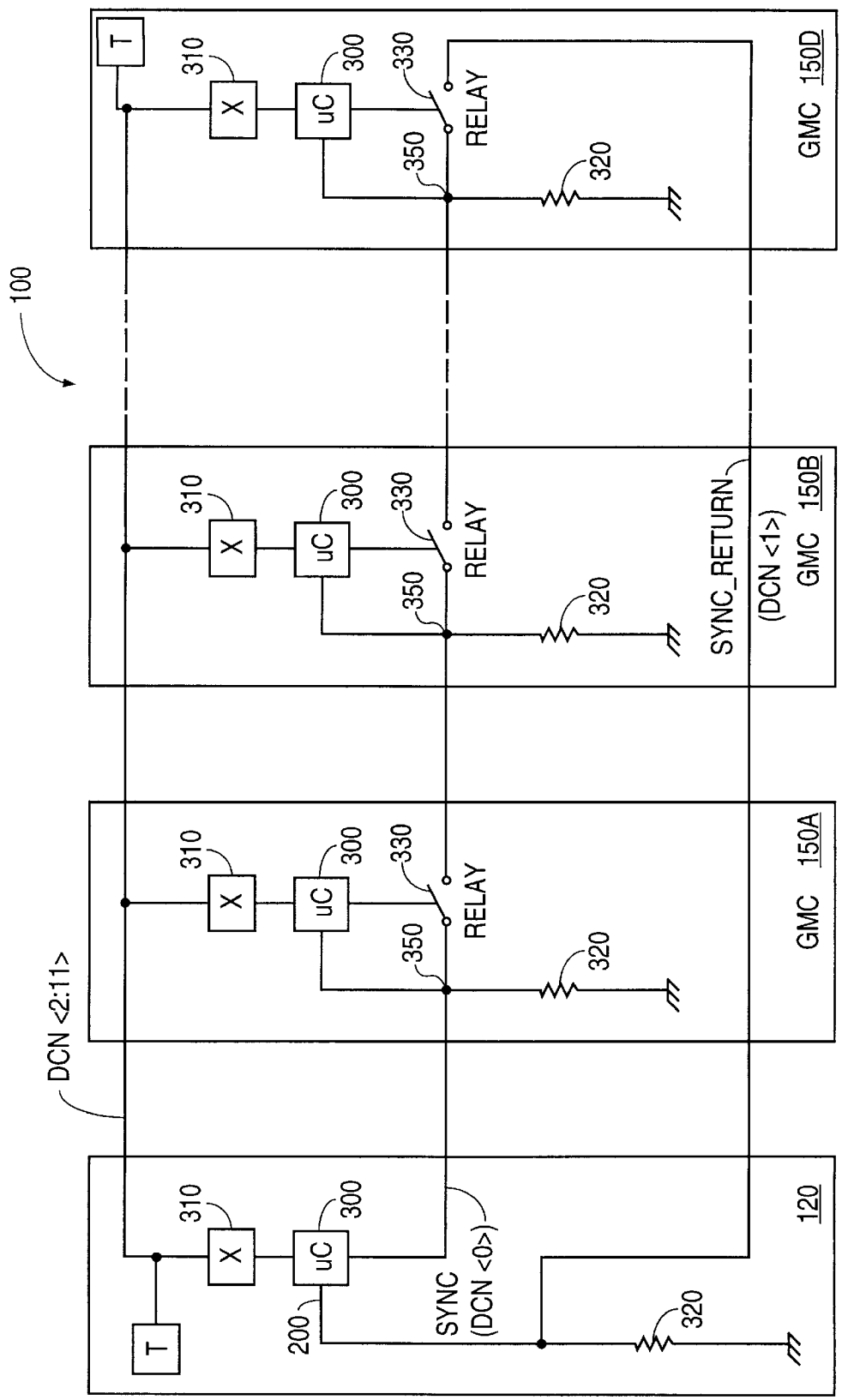
FIG. 3 is a schematic diagram of the devices on the display-and-control network DCN of system 100.

FIG. 3 is a schematic diagram that includes some of the devices on the display-and-control network DCN of system 100. Each device includes a microcontroller 300, a bus transceiver 310, and a pull-down resistor 320. GMCs 150A–D further include install relays 330. A synchronization line SYNC (DCN<0>)is used during normal operation to synchronize the devices on display-and-control network DCN and during installation to identify and install each of GMCs 150A–D.

Microcontrollers 300 are available from Motorola Semiconductor Products, Inc., of Phoenix, Ariz., as part number 68HC11D3. The same microcontroller is used in each of sensor units 160. Consequently, the serial ports and baud rates of GMCs 150A–D are compatible with those of sensor units 160. A conventional universal asynchronous receiver-transmitter (UART) internal to microcontrollers 300 communicates with up to 32 local sensor units 160 through an electrostatic-discharge-protected bus transceiver 310. In one embodiment, transceivers 310 are EIA standard RS485 transceivers available from Maxim Integrated Products of Sunnyvale, Calif., as part no. MAX483E.

Control unit 120 generates a synchronization signal on line SYNC that propagates through all devices on display-and-control network DCN when weed spraying system 100 is operational. For purposes of illustration, FIG. 3 includes control unit 120 and group master controllers 150A, 150B, and 150D; however, other devices, including GreenStar interface 130, and speed sensor 125 (FIG. 2), may also be connected to display-and-control network DCN.

Before weed spraying system 100 is operational, control unit 120 installs each position-sensitive device on display-and-control network DCN. The line SYNC conveys an installation signal during this installation mode. Each position-sensitive device on display-and-control network DCN (GMCs 150A–150D) can choose to block or pass the installation signal on line SYNC to an adjacent device. Eventually, the SYNC line loops back, via a SYNC-RETURN line (DCN<1>), to an input terminal 200 of control unit 120. The remaining lines of display-and-control network DCN (i.e., DCN<2:11>) are connected to each device on display-and-control network DCN and to conventional bus terminations T.

Due to the possibility that various of the position-sensitive devices on the display-and-control network DCN have been replaced or transposed, control unit 120 cannot be certain that the addresses of those devices accurately correspond with their respective positions when system 100 is first powered up. Thus, all messages sent from control unit 120 to GMCs 150A–150D during the installation process are directed to a dedicated initialization address, in one embodiment the address 0x00. The initialization signal on synchronization line SYNC is used to select, in turn, each of GMCs 150A–150D. The synchronization line SYNC avoids bus contention when the initialization address is presented on network DCN by ensuring that only one device responds at a time.

Figure 4:
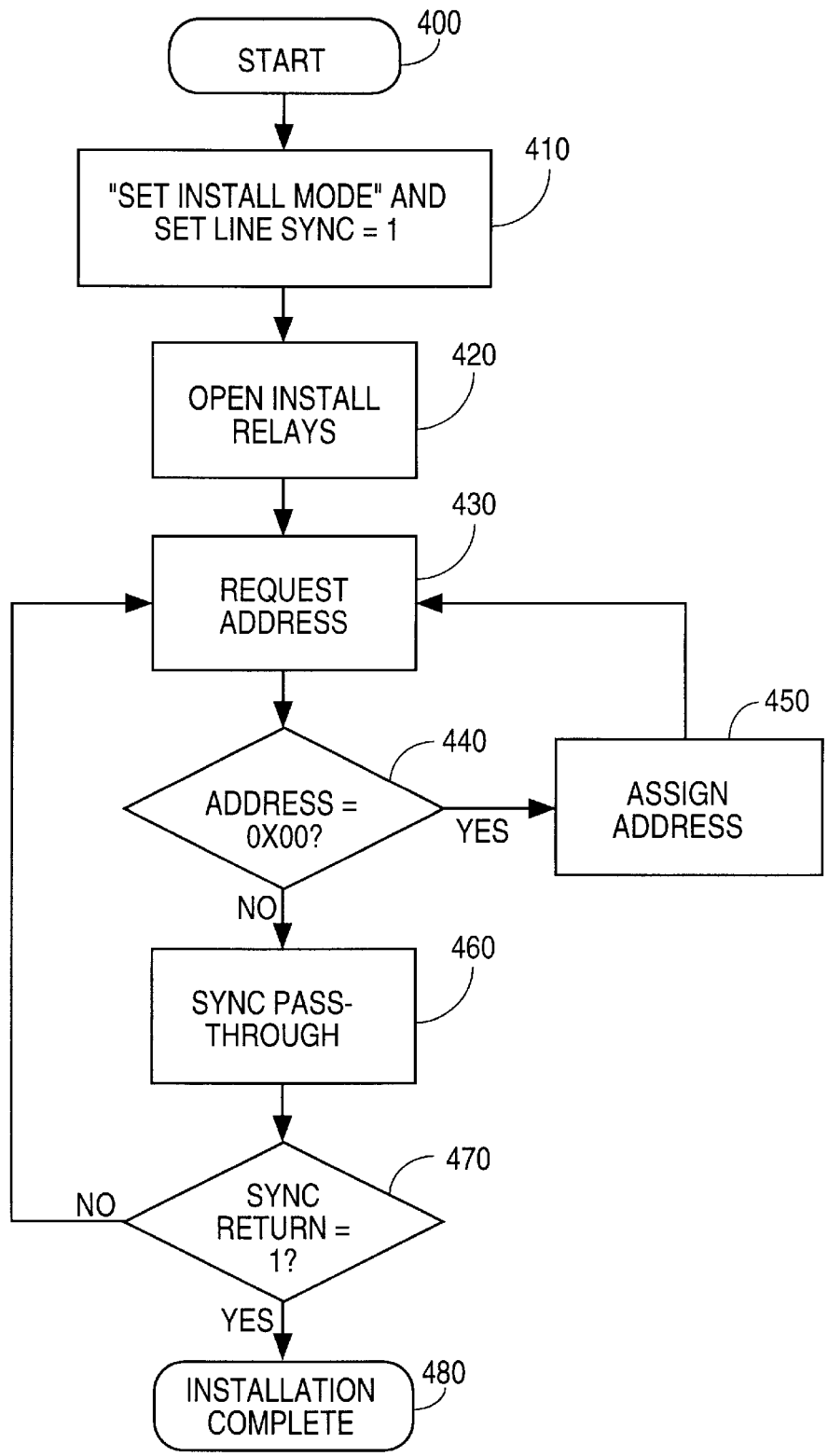
FIG. 4 is a flowchart depicting an installation sequence for the devices on display-and-control network DCN.

FIG. 4 is a flowchart depicting an installation sequence for the devices on display-and-control network DCN. The process normally begins (step 400) following self-test procedures performed by the various devices on the display-and-control network DCN. However, if one such device was reset accidentally (by electronic noise, for example), then control unit 120 may optionally choose to force the affected device directly into an operational mode, bypassing the need to repeat the installation procedure.

From step 400, the process continues to step 410 in which control unit 120 broadcasts a "SET INSTALL MODE" message to all devices on display-and-control network DCN and drives the synchronization line SYNC to a logic one. In response to the message, each position-sensitive device on the display-and-control network DCN enters the install mode and opens its respective install relay 330 (step 420). In one embodiment, each of install relays 330 is a conventional low-power n-channel mosfet having a gate controlled from a port pin on microcontroller 300, though other types of relays or switches may be used. (In the example of FIG. 3, the only position-sensitive devices are GMCs 150A, 150B, and 150D.)

Next, control unit 120 sends a "REQUEST ADDRESS" message over display-and-control network DCN (step 430). In response, each position-sensitive device on display-and-control network DNC tests the logic level of its respective SYNC input terminal 350. If a device has not yet been assigned an address and the logic level on the respective SYNC input terminal 350 is a logic one, then that device is selected for installation and will therefore respond to the REQUEST ADDRESS message. Those devices on display-and-control network DNC that are not position sensitive ignore the logic level on line SYNC during the installation mode.

In the example of FIG. 3, GMC 150A is selected and will therefore respond to the REQUEST ADDRESS message. The remaining devices, GMCs 150B–D, will not respond because install relay 330 of mapping unit 140 inhibits the installation signal on line SYNC from affecting those devices. Pull-down resistors 320 of GMCs 150A–D ensure that the logic levels on terminals 350 remain at ground potential (logic zero) unless the installation signal on line SYNC is a logic one and each preceding one of install relays 330 is closed.

The selected device, GMC 150A in the example of FIG. 3, responds to the REQUEST ADDRESS message with its current address (or 0x00 if no address is currently programmed) and a one-byte device-identification code. The identification code is used to differentiate between different types of position-sensitive devices that may be resident on display-and-control network DCN. If the device responds with an address of 0x00 (decision 440), control unit 120 then responds back to the device with an "ASSIGN ADDRESS"

command (step 450), which includes an address to be assigned to the selected device. The selected device then stores the address, in an EEPROM for example.

Having assigned an address to a device of display-and-control network DCN, control unit 120 re-issues the "REQUEST ADDRESS" message to confirm that the assigned address was received and stored. If the device (e.g., GMC 150A) does not respond with the appropriate address, control unit 120 indicates the error on status display 110. Conversely, if the device responds with the assigned address, then control unit 120 sends a "SYNC PASS-THROUGH" command (step 460) to the device being installed.

The SYNC PASS-THROUGH command causes the selected device on display-and-control network DCN to close its respective install relay 330. Closing install relay 330 passes the logic one on synchronization line SYNC to the adjacent device on display-and-control network DCN, thereby preparing the adjacent device (e.g., GMC 150B) for installation. Alternatively, if all of the devices on display-and-control network DCN are installed, then the signal on return line SYNC_RETURN is a logic one (decision 470), in which case the installation process is complete (step 480). If the signal on return line SYNC_RETURN is a logic zero, then the installation process returns to 430. The process then continues until control unit 120 senses a logic one on terminal 200, which indicates that all of install relays 330 are closed and that each device on the display-and-control network DCN is installed.

During normal system operation (e.g., mapping and weed spraying), return line SYNC-RETURN may be used to sense breaks in synchronization line SYNC that could affect the operation of system 100. The SYNC-RETURN line can also be used to sense the presence of excessive noise, which could also adversely affect the operation of system 100.

The process of installing position-sensitive devices (e.g., sensor units 160 or speed sensors) on the sensor-unit network SUN is essentially the same as described above for the devices on the display-and-control network DCN. However, the synchronization commands originate from individual group master controllers (e.g., GMC 150A) instead of from control unit 120, and the default address for unassigned ones of sensor units 160 is 0x80 instead of 0x00. GMCs 150A–D, in response to installation commands from control unit 120, install all of their respective ones of sensor units 160 on the sensor unit networks SUN_A–D. Because of the similarity of the installation procedures for the DCN and SUN networks, a description of the process of installing sensor units 160 is omitted for brevity.

The foregoing processes of assigning unique addresses to all of the position-sensitive devices on the DCN and SUN networks advantageously allow control unit 120 to automatically correlate the physical location of each position-sensitive device with a unique address. This correlation is especially beneficial for field mapping operations because precise mapping requires knowledge of the relative positions of the sensors. The process of uniquely identifying and locating each device on the GMC and SUN networks is repeated on each power-up to ensure that changes in the configuration of system 100 are detected and compensated for without operator intervention.

Although the present invention has been described in considerable detail with reference to certain preferred versions thereof, other versions are possible. For example, while the present invention is described in the connection with mapping for purposes of spraying herbicide, the invention is equally applicable to mapping other types of field features, such as soil composition, water content, or pest damage. The present invention is further applicable to agricultural operations that may be controlled by previously obtained field maps. Such operations include watering, fertilizer or pesticide application, and controlling an automatic hoe. Hence, the scope of the appended claims is not limited to the description of the preferred versions contained herein.

What is claimed is:

1. An agricultural implement comprising:
   a supporting member affixed to a vehicle, the vehicle configured to traverse a field along an axis of travel;
   a plurality of agents affixed to the supporting member, each of the agents having a unique address and being physically located a distance from the axis of travel such that the agents traverse parallel paths as the vehicle moves along the axis of travel; and
   a controller affixed to the vehicle and connected to each of the plurality of agents, the controller configured to automatically assign the unique address of each agent based upon the physical location of each agent.

2. The implement of claim 1, wherein the controller is connected to the plurality of agents via a bus.

3. The implement of claim 2, wherein the bus includes data lines, and wherein the agents are connected to the data lines in parallel.

4. The implement of claim 1, wherein the agents comprise optical sensors configured to sense the presence of weeds in the field.

5. The implement of claim 1, wherein the agents comprise dispensers configured to dispense material onto the field.

6. The implement of claim 5, wherein the material is herbicide.

7. The implement of claim 1, wherein the bus is a communication bus that includes an addressing line serially connected through each of the agents.

8. The implement of claim 7, wherein each of the agents includes a switch connected in series with the addressing line, the state of the switch indicating whether the controller has correlated the address and physical location for a given one of the agents.

9. The implement of claim 1, further comprising a global positioning system for establishing the position of the axis of travel.

10. A method for creating a map of an agricultural field, the map providing positional information as to at least one field characteristic, the method comprising:
    positioning a plurality of sensors at a corresponding plurality of unique physical locations on a vehicle such that the sensors traverse parallel paths as the vehicle moves along an axis of travel;
    for each of the plurality of sensors:
        detecting the presence of the sensor at a unique physical location;
        assigning a unique address to the detected sensor, the unique address corresponding to the unique physical location at which the sensor was detected;
    traversing the field with the plurality of sensors; and
    transmitting from each sensor the unique address and data indicating the presence of the field characteristic while traversing the field with the plurality of sensors.

11. The method of claim 10, wherein the sensors comprise optical sensors configured to sense the presence of weeds in the field.

12. A method for automatically controlling an agricultural operation on a field using a previously created map of the field, wherein the map includes positional information locating instances of at least one field characteristic, the method comprising:

positioning a plurality of agents at a corresponding plurality of unique physical locations on a vehicle such that the agents traverse parallel paths as the vehicle moves through the field along an axis of travel;

for each of the plurality of agents:
      detecting the presence of the agent at a unique physical location with respect to the axis of travel;
      assigning a unique address to the detected agent, the unique address corresponding to the unique physical location at which the agent was detected;

traversing the field with the plurality of agents and activating at least one of the agents when the physical location of the at least one agent corresponds to one of the instances of the at least one field characteristic.

13. The method of claim 12, wherein one of the at least one field characteristic is the presence of weeds, and wherein the agent is an herbicide sprayer.

14. The method of claim 12, further comprising maintaining the location of the vehicle using a global positioning system.

* * * * *